(12) United States Patent
Peter et al.

(10) Patent No.: US 6,454,071 B1
(45) Date of Patent: Sep. 24, 2002

(54) TOOTHED COUPLING FOR TRACKED VEHICLES

(75) Inventors: Berthold Peter, Gersthofen; Günter Proske, Augsburg, both of (DE)

(73) Assignee: Renk AG, Augsburg (DE)

( * ) Notice: Subject to any disclaimer, the term of this patent is extended or adjusted under 35 U.S.C. 154(b) by 0 days.

(21) Appl. No.: 09/649,245

(22) Filed: Aug. 28, 2000

(30) Foreign Application Priority Data

Aug. 27, 1999 (DE) .......................................... 199 40 661

(51) Int. Cl.⁷ ................................................ F16D 11/14
(52) U.S. Cl. ......................... 192/69.9; 192/94; 192/95; 192/101
(58) Field of Search ........................... 192/69.9, 94, 95, 192/101, 114 R; 74/405

(56) References Cited

U.S. PATENT DOCUMENTS

| | | | | |
|---|---|---|---|---|
| 3,058,558 A | * | 10/1962 | Hawk | 192/69.9 |
| 3,504,564 A | * | 4/1970 | Kell | 74/405 X |
| 4,098,138 A | * | 7/1978 | Miller | 74/405 |
| 4,491,037 A | * | 1/1985 | Bullock | 74/405 X |
| 4,685,550 A | * | 8/1987 | Metcalf | 192/101 X |

FOREIGN PATENT DOCUMENTS

GB    2 241 766 A    9/1991

* cited by examiner

*Primary Examiner*—Richard M. Lorence
(74) *Attorney, Agent, or Firm*—Cohen, Pontani, Lieberman & Pavane

(57) ABSTRACT

A toothed coupling for tracked vehicles is provided having a coupling sleeve with internal toothing in engagement with one externally toothed gear and capable of engagement with another externally toothed gear. The toothed coupling is axially displaceable and fixable at defined positions. The coupling sleeve includes a flange part of the coupling sleeve extending radially inward and a spindle connected to the flange part and arranged coaxially with the coupling sleeve for rotating the coupling sleeve about the axis of the coupling sleeve. A spindle nut is arranged on the spindle with a blocking part on one end of the spindle. A tool for engaging the blocking part is also provided where removal of the tool from the blocking part is possible only at defined axial positions of the spindle.

9 Claims, 5 Drawing Sheets

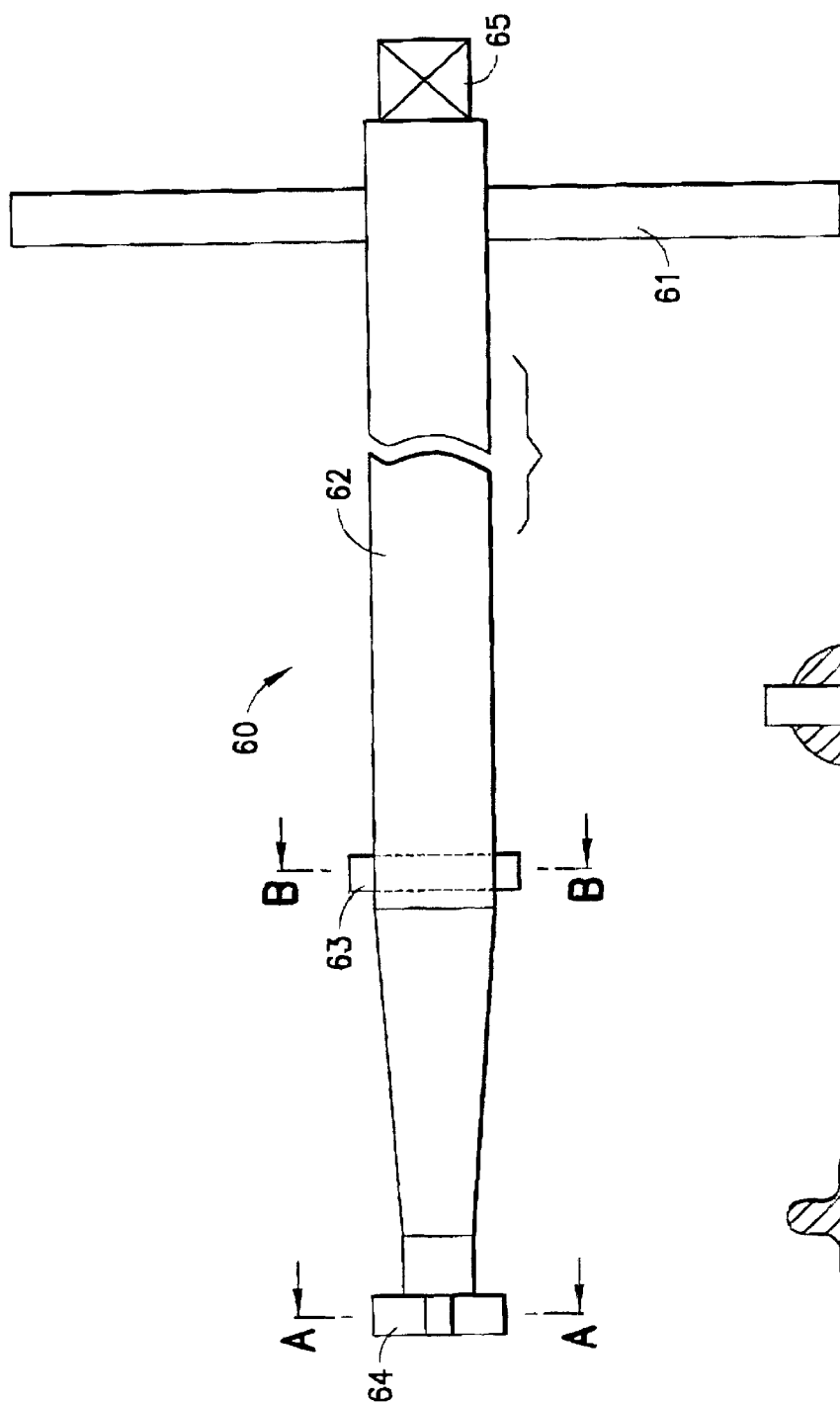

TOOTHED COUPLING FOR TRACKED VEHICLES

BACKGROUND OF THE INVENTION

1. Field of the Invention

The present invention relates to a toothed coupling for tracked vehicles.

2. Description of the Related Art

British reference GB-2 241 766 discloses a toothed coupling which connects an output drive shaft of a transmission to a track drive wheel. Such couplings enable the final drive to be decoupled from the main transmission to allow the vehicle to be towed over relatively long distances, for example, without causing damage to the transmission or removing the transmission from the vehicle.

The coupling disclosed comprises a gear arranged on the output drive shaft of the transmission. An internally toothed coupling sleeve is slipped onto the gear. The other internally toothed end of the coupling sleeve is in engagement with another gear arranged on the input shaft of the final drive. This drive connection can be released by axial displacement of the coupling sleeve towards the main transmission.

The coupling sleeve has a radially inward extending flange having radial holes arranged between the toothed ends of the sleeve. This flange is guided in an axially displaceable manner on a hub that has radial notches and is secured on the output shaft. The flange can be fixed in the coupled or decoupled position. The hub is secured on the output drive shaft in a manner that allows angular movement. Balls are pressed into the notches of the hub from the flange side by spring force. The balls are inserted into radial holes in the flange. Hole springs and additional pins are arranged in the holes for securing the balls. The pins are supported by a collar that surrounds the coupling sleeve.

For axial displacement of the coupling sleeve, the collar has a radially projecting lever screwed onto it for turning the collar a predetermined angle in the circumferential direction. This brings the collar into a position opposite hole recesses which give the pins displacement space in the radial direction. The balls are thus released and can slide out of the respective notch in the hub against the spring force. The coupling sleeve can then be displaced into the coupled or decoupled position in the axial direction by means of the lever. In the respective end position, the collar must be turned back into the securing position, where it engages by means of spring force. Finally, the lever must be removed.

The fact that displacement is effected by the radially outward-projecting lever means that force is introduced into the coupling sleeve in an unfavourable manner. Thus, a large force is required and must be increased even further due to incipient tilting of the sleeve. The fact that the lever is arranged between the main transmission and the vehicle wall makes it necessary to provide a clearance at this point to allow access to the coupling sleeve.

SUMMARY OF THE INVENTION

It is the object of the present invention to provide a toothed coupling which reliably allows complete coupling and decoupling in a simpler manner.

Pursuant to this object, and others which will become apparent hereafter, one aspect of the present invention resides in a toothed coupling for tracked vehicles having a main transmission and a final drive. The toothed coupling includes a first externally toothed gear connectable to the main transmission, a second externally toothed gear connectable to the final drive, and a coupling sleeve having an internal toothing in engagement with the first externally toothed gear and being engagable with the second externally toothed gear. The coupling sleeve is axially displaceable and fixable at defined positions. The coupling sleeve has a flange that extends radially inward substantially perpendicular with respect to an axis of the coupling sleeve. A spindle is connected to the flange part and arranged coaxially with the coupling so as to be capable of rotating the coupling sleeve about the axis. A spindle nut is arranged on the spindle and a blocking part is arranged on an end of the spindle is radially displaceable. A tool is provided for engaging the blocking part, the tool being removable from the blocking part only at defined axial positions of the spindle. Since the displacement force is introduced centrally in the present invention, tilting of the coupling sleeve is avoided, and small forces are required for coupling or decoupling.

A complete coupling and decoupling operation is made possible even without visual monitoring because of the advantageous configuration of the toothed coupling of the present invention. Due to the advantageous central operation of the toothed coupling, no clearance is necessary between the main transmission and the vehicle pan, making it possible to construct a narrower vehicle or to use wider transmissions.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

A preferred embodiment will be explained in greater detail by means of the drawings in schematic form described below:

FIGS. 3a, b, c are an overall view of a tool according to the present invention and designated sections of it.

DETAILED DESCRIPTION OF THE PRESENTLY PREFERRED EMBODIMENTS

Figure 1A:
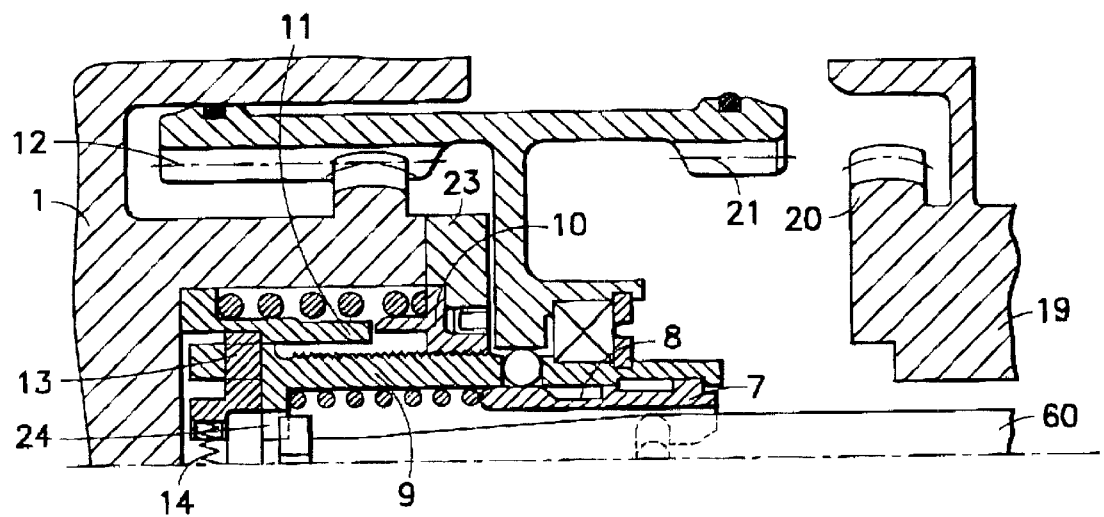
FIGS. 1a and 1b are a longitudinal section through an arrangement according to the present invention, showing the decoupled position of the coupling sleeve in FIG. 1a and the coupled position in FIG. 1b.
Figure 1B:
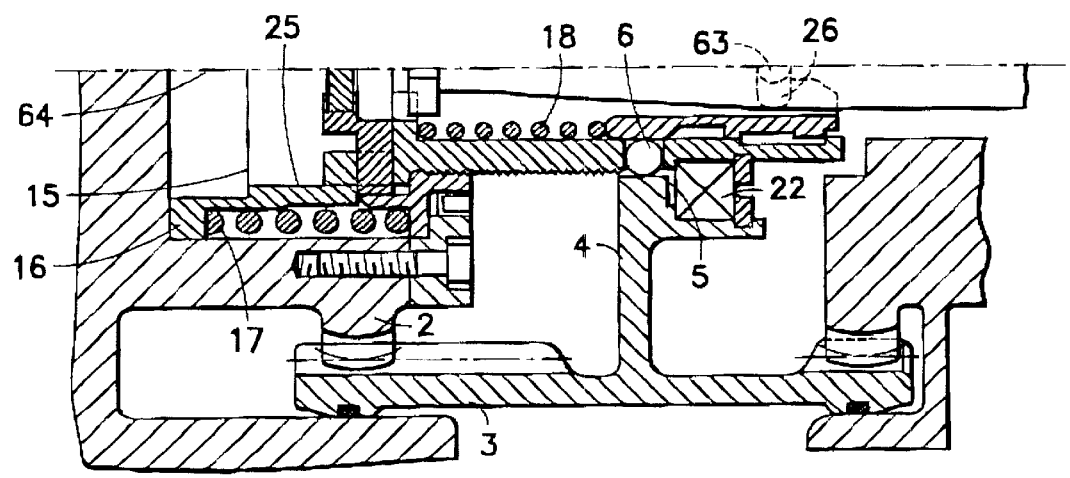

Referring now to FIGS. 1a and 1b, a preferred embodiment of the present invention is shown in a longitudinal section. An output shaft 1 of the main transmission (not shown) preferably carries a curved tooth gear 2, over which a coupling sleeve 3 is slipped. At its transmission side end, the coupling sleeve 3 is toothed 12 over a wider area than at its end pointing towards the final output drive. As a result, the gear 2 is always in engaged with the coupling sleeve 3, even in the decoupled state.

FIG. 1b shows the coupled state. The toothing 21 of the coupling sleeve 3 is in engagement with the gear 20, which is connected to the input shaft 19 of the final drive. The interior of the coupling mechanism is protected from penetration of dirt or liquid by sealing elements (not designated specifically) on the outer circumference of the coupling sleeve 3.

The coupling sleeve 3 has a radially inward pointing flange 4 between the two sets of toothing 12, 21 which supports the coupling sleeve 3 rotatably on a spindle 9 by means of a bearing 22. The bearing 22 is preferably a rolling-contact bearing that can transmit axial forces. Balls 6, that engage in toothing 5 on the flange 4 can block the spindle 9 from rotating relative to the coupling sleeve 3. As a result, unintentional displacement of the coupling sleeve 3 is prevented. The balls 6 are inserted into holes in the sleeve shaped spindle 9 and project at the outer circumference of the spindle 9, where they engage in the toothing 5. At an inner circumference of the spindle 9, the balls 6 rest against a retaining sleeve 7 inserted into the spindle 9. The retaining sleeve 7 is connected to the spindle 9, by means of toothing for example, in a manner which prevents relative rotation but allows axial displacement and is pressed against a stop at the end of the spindle 9 by a spring 18. When a tool 60 is inserted, the retaining sleeve 7 is pushed into the spindle 9 against the force of the spring 18 by means of a pin 63, which engages in a receptacle 26 in the retaining sleeve 7. This allows the balls 6 to slide into a depression 8 running around the retaining sleeve 7 and to release the toothing 5 on the flange 4. Once the tool 60 is removed, the retaining sleeve 7 is pushed back automatically into its blocking position by the spring 18.

The spindle 9 carries a blocking part 13 at its end facing the output shaft 1 of the main transmission. The blocking part 13, can be displaced in a radial direction and be pushed radially outwards by a spring 14. In the completely decoupled position of the spindle 9 or coupling sleeve 3, the blocking part 13 rests against a shoulder 15 and secures the spindle 9 additionally against axial displacement (illustrated in FIG. 1a).

In FIG. 1b, the blocking part 13 rests against a shoulder 11 and secures the spindle 9 in the completely coupled position. The exact mode of operation of the blocking part 13 is explained in greater detail below with reference to FIG. 2. The spindle 9 interacts with a spindle nut 10 capable of angular motion. The spindle nut 10 is connected to the output shaft 1 by curved toothing and an internally toothed cover 23 flanged to the output shaft 1 in a manner which prevents relative rotation. The spindle nut 10 is pressed against a stop on the cover 23 by a spring 17. The spring 17 is supported by a sleeve 16, which is inserted into a turned recess on the output shaft 1.

Figure 2A:
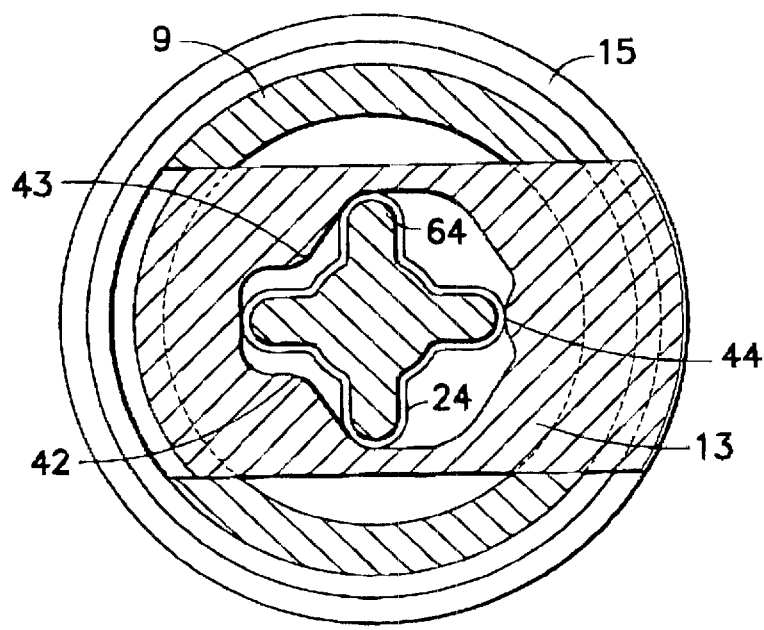
FIG. 2a is a view C—C of FIG. 1 at the beginning of a coupling operation.

FIG. 2 shows the blocking part 13 on an enlarged scale in a section corresponding to view C—C of FIG. 1. FIG. 2a represents the position of the blocking part 13 in the decoupled position as shown in the upper half of FIG. 1. The blocking part 13 is pushed to the right or radially outwards in its guide on the spindle 9 by the spring 14 (not shown) and rests against the shoulder 15. The tool 60 has pushed the retaining sleeve 7 into the spindle 9 against the force of the spring 18 (see FIG. 1). The cross 64 has entered the blocking part 13 through the opening 24 in the spindle 9. A clearance on the blocking part 13 behind the opening 24 allows the cross 64 to be rotated relative to the opening 24.

Figure 2B:
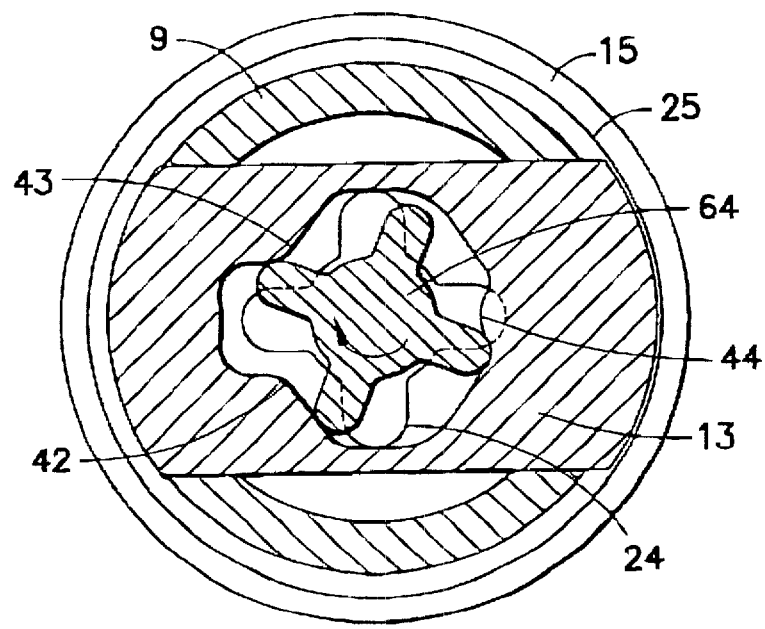
FIG. 2b is the same view as FIG. 2a except it is during a coupling operation.

Referring now to FIG. 2b in conjunction with FIG. 1, it can be seen that rotation of the tool 60 in the direction of the arrow indicated causes one arm of the cross 64 to displace the blocking part 13 to the left or radially inwards by means of a projection 42. As a result, the blocking part 13 is no longer blocked by the shoulder 15. The cross 64 of the tool 60 is no longer congruent with the opening 24 in the spindle 9 and cannot be pulled out in this position.

If the tool 60 is further rotated in the direction of the arrow, the spindle 9 is taken along in rotation by the retaining sleeve 7, which has driver elements for the pin 63 of the tool 60. As a result, the spindle 9 is displaced in the axial direction and the blocking part 13 guided on the spindle 9 is moved over the shoulder 15. The tool 60 is prevented from turning back in this axial position by a blocking projection 44, which clamps the blocking part 13 radially outwards against the wall of the hole 25 by way of one arm of the cross 64. This is the case in all axial positions between the shoulders 15, 11, with the result that the cross 64 remains rotated relative to the opening 24 and the tool 60 cannot be removed.

Once the requisite number of rotations of the spindle 9 for coupling have been performed, the blocking part 13 has overrun the shoulder 11 in the axial direction, and the tool 60 can be turned back. Then the blocking part 13 comes to rest against the shoulder 11 and the cross 64 comes into overlap with the opening 24 and can be removed.

In all positions in which the cross 64 of the tool 60 is rotated relative to the opening 24 in the spindle 9, the force of the spring 18 is absorbed between the cross 64, which is supported against the spindle 9, and the pin 63, which is supported against the receptacle 26 of the retaining sleeve 7. As a result, the tool 60 is free from forces towards the outside. When the tool 60 is removed, the retaining sleeve 7 is pushed back into its initial position by the spring 18, and the balls 6 in the toothing 5 prevent further unintentional rotation of the spindle 9.

To release the coupling, the tool 60 can be reinserted. The depression 8 in the retaining sleeve 7 receive the balls 6 from the toothing 5, and the blocking part 13 is being moved radially inwards with the projection 43 by rotation in the direction opposite the arrow. Further rotation moves the blocking part 13 in the axial direction with the spindle 9 beyond the shoulder 11, and, as with coupling, the tool 60 can only be turned back and removed once the second shoulder 15 has been overrun.

FIG. 3 shows a tool 60 for carrying out a coupling or decoupling operation on the toothed coupling. According to FIG. 3a, the tool 60 comprises a shank 62 that tapers conically towards one end. At this end, the tool 60 carries a cross 64, the cross section of which can be seen from FIG. 3b. The cross 64 has four equal arms having rounded transitions the arms.

A pin 63 is mounted on the shank 62 of the tool 60 at a distance from the cross 64 such that, when the tool 60 is inserted into the coupling, the cross 64 only strikes the end of the blocking part 13 when the retaining sleeve 7 has been pushed into the spindle 9 by the pin 63 to such an extent that the balls 6 release the toothing 5. The pin 63 projects beyond the shank 62 on both sides, as shown in FIG. 3c. As the tool 60 is inserted, the pin 63 rests axially against the receptacle 26 of the retaining sleeve 7 and feeds the rotary motion of the tool 60 into the retaining sleeve 7 at the receptacle 26, by means of driver elements, only when the blocking part 13 has been released by the cross 64.

At the end of the shank 62 opposite the cross 64 is a square feature 65. A hammer action driver may, for example, be applied, to the square feature 65. It is also possible for a hexagonal feature or some other form of form-locking connection to a drive to be provided instead of a square feature 65. A lever 61, by means of which the tool 60 can be operated manually, is arranged at this end of the shank 62 in addition to the square feature 65.

Instead of the cross 64 described, it is also possible to provide any other shape that matches the blocking part 13. The same also applies to the pin 63, although this part of the tool 60 must be matched to the retaining sleeve 7. It is also possible, for example, to provide a further pin transversely to the pin 63.

Figure 4:
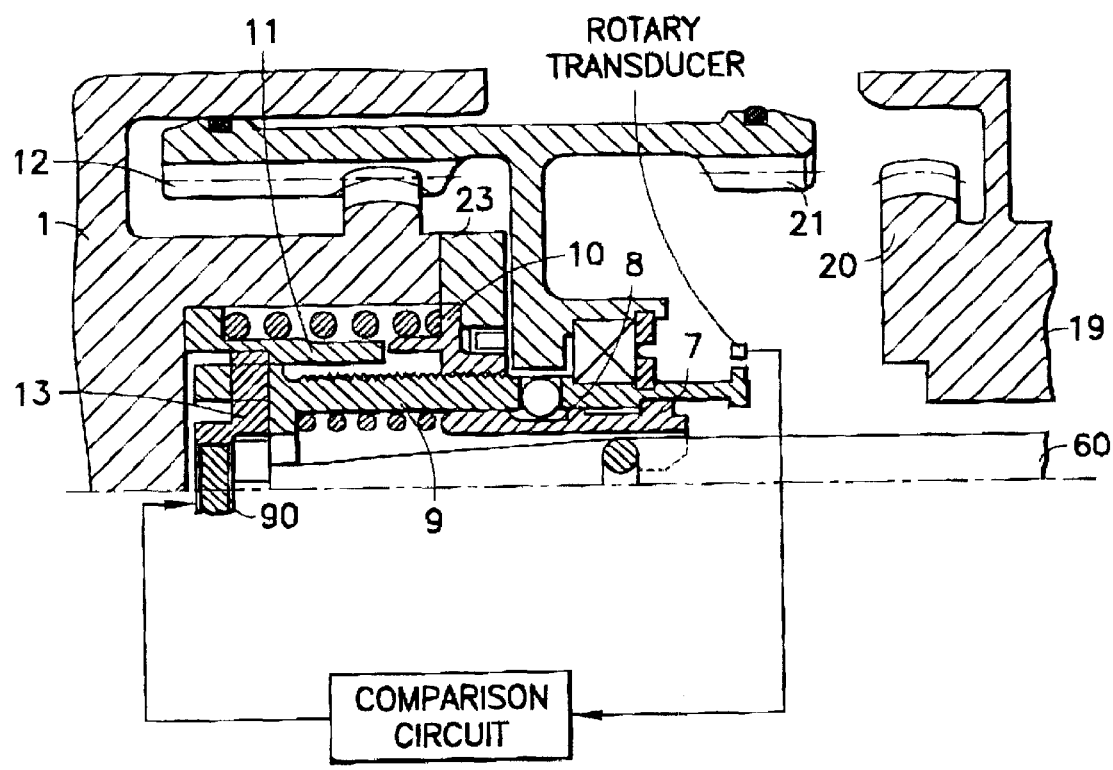
FIG. 4 shows another embodiment for fixing the tool.

It is also possible, as shown in FIG. 4, for the purpose of fixing the tool 60, to arrange an electromagnet 90 that can be controlled by electrical switching means on the blocking part 13. The electrical switching means can comprise a rotary transducer, which is mounted on the spindle 9 and records the number of revolutions performed, and an electronic comparison circuit, which switches off the magnet when the signals from the rotary transducer coincide with signals permanently stored in the comparison circuit.

Another embodiment provides limit switches, which are operated by the spindle in the fully coupled and decoupled positions and open the electrical circuit of the electromagnet, thereby allowing the tool 60 to be removed at these axial positions of the spindle 9.

Thus, while there have been shown and described and pointed out fundamental noel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A toothed coupling for tracked vehicles having a main transmission and a final drive, the toothed coupling, comprising:
    a first externally toothed gear connectable to the main transmission;
    a second externally toothed gear connectable to the final drive;
    a coupling sleeve having an internal toothing in engagement with the first externally toothed gear and being engagable with the second externally toothed gear, the coupling sleeve being axially displaceable and fixable at defined positions, the coupling sleeve having a flange extending radially inward substantially perpendicular with respect to an axis of the coupling sleeve;
    a spindle connected to the flange and arranged coaxially with the coupling sleeve so as to be capable of rotating the coupling sleeve about the axis;
    a spindle nut arranged on the spindle;
    a blocking part arranged on an end of the spindle and radially displaceable; and
    a tool capable of engaging the blocking part, wherein removal of the tool from the blocking part is possible only at defined axial positions of the spindle.

2. The toothed coupling according to claim 1, wherein the blocking part has a plurality of projections configured so as to push the blocking part radially inward when turning the tool, and a blocking projection configured to prevent the tool from being turned back.

3. The toothed coupling according to claim 1, further comprising:
    an electromagnet arranged on the blocking part for fixing the tool; and
    electrical switch means operable by the spindle for controlling the electromagnet, the electrical switch means being operable at unlimited axial positions.

4. The toothed coupling according to claim 3, wherein the electrical switching means includes a rotary transducer mounted on the spindle and an electronic comparison circuit with permanently stored signals, wherein the electromagnet is switched off when signals from the rotary transducer coincide with the signals in the electronic comparison circuit.

5. The toothed coupling according to claim 3, wherein the electrical switching means comprises a plurality of switches for opening a circuit to activate the electromagnet, wherein the switches are operable at defined axial positions of the spindle.

6. The toothed coupling according to claim 1, further comprising:
    a retaining sleeve arranged on the spindle, and a plurality of balls capable of interacting with the retaining sleeve so as to form a rotationally fixed connection between the spindle and the flange.

7. The toothed coupling according to claim 6, wherein the tool is operative to release the rotationally fixed connection.

8. The toothed coupling according to claim 1, wherein the externally toothed gears have curved toothing.

9. A toothed coupling according to claim 1, wherein the blocking part has an opening with a shape, and the tool comprises:
    a shank having a first end and a second end;
    a disc at the first end of the shank, wherein the disc has a shape corresponding to the shape of the opening of the blocking part;
    a pin arranged a predetermined axial distance from the blocking part and projecting radially beyond the shank;
    a square feature formed on the second end of the shank; and
    a lever secured proximate to the second end of the shank.

* * * * *